Figure 1:
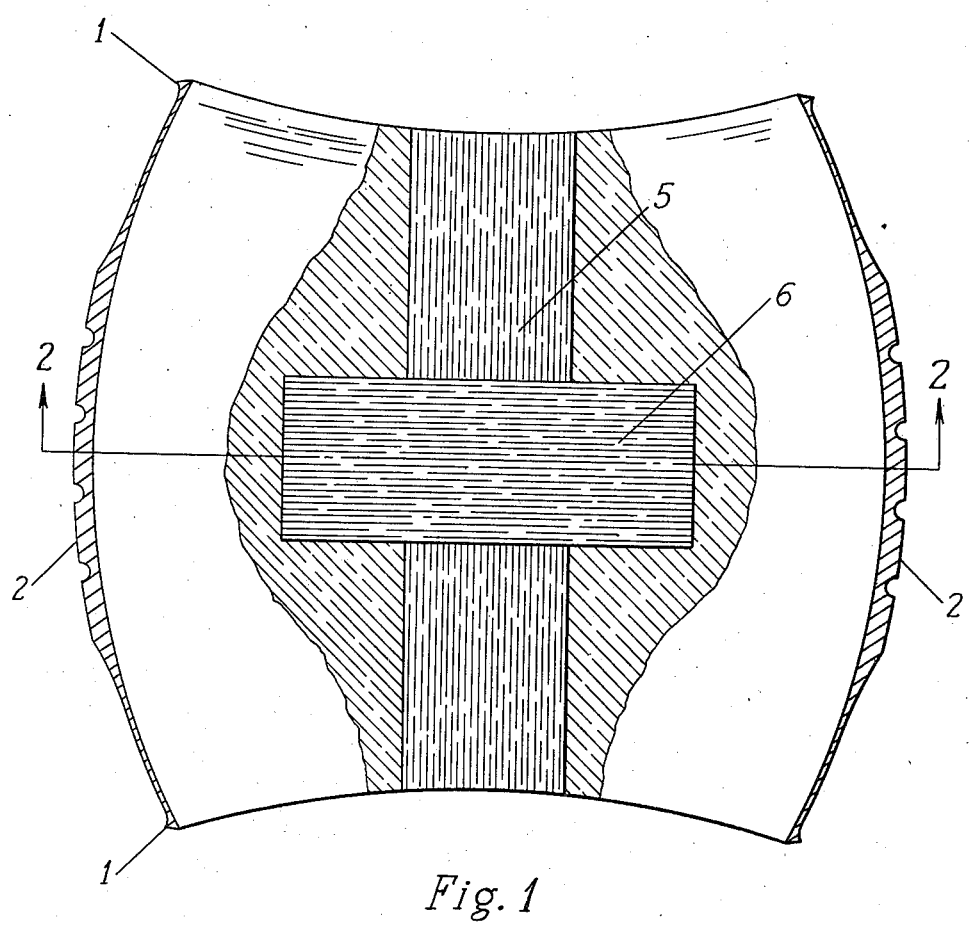

Feb. 22, 1944.  J. C. HEINTZ  2,342,195
TIRE REPAIR
Filed March 1, 1943  2 Sheets-Sheet 1

Inventor
James C. Heintz

By Gordon C. Mack
Attorney

Feb. 22, 1944.  J. C. HEINTZ  2,342,195
TIRE REPAIR
Filed March 1, 1943  2 Sheets-Sheet 2

Inventor
James C. Heintz
By Gordon C. Mack
Attorney

Patented Feb. 22, 1944

2,342,195

UNITED STATES PATENT OFFICE 2,342,195

TIRE REPAIR

James C. Heintz, Lakewood, Ohio

Application March 1, 1943, Serial No. 477,499

4 Claims. (Cl. 152—367)

This invention relates to an improved tire repair. More particularly it relates to a repair in a tire constructed in the usual manner with the cords running diagonally. The repair is made with cord fabric with the cord lying in the bead-to-bead direction, and additional fabric may be used with the cord lying circumferentially of the tire.

The cords in the carcass of a modern tire run diagonally, and in alternate plies the cords run in different directions. If a tire needs repairing, some of its cords are broken. Theoretically the correct way to repair the tire would be to remove these broken cords and replace them with new sound cords, but that is impractical. It would necessitate tearing the tire apart. In practice, all repairing methods consist in merely patching the tire to reinforce it at the point of injury.

In the past all reinforcements have been built with the cords running diagonally, at substantially the same angle as the tire cords. It has been impossible to calculate or estimate the amount of such reinforcing material required to compensate for the damage done to the tire. As a consequence tire repairs have been very, very poor.

In an inflated tire the principal strain is cross-sectional, from bead to bead. There is some circumferential strain, and particularly when the rate of movement of the vehicle on which it is mounted is altered, as is starting or stopping. On the basis of this analysis it is evident that the reinforcement of the tire repair should be from bead to bead and circumferential, and in the tire repair of this invention the cords in the patches run in a bead-to-bead direction, and patches with the cords running circumferentially may be used. The amount of reinforcement required in the bead-to-bead patches may be easily calculated, as in the following examples.

In a four-ply passenger tire with a six-inch diameter, carrying thirty pounds air pressure, a one-ply patch is sufficient to repair an ordinary injury if the patch is placed with the cords running from bead to bead. Suppose, for example that a tire has a two-inch injury in it. A three-inch strip of cord fabric gives all the reinforcement needed. This is evident from the fact that such a cord has, for example, sixteen cords to the inch, each of fifteen pounds tensile strength, making a total reinforcement of seven hundred and twenty pounds in a three-inch strip, whereas only one hundred and eighty pounds is required to offset the weakening produced by the two-inch injury. The three-inch strip therefore provides a factor of safety and strength of four to one.

In a truck tire a three-inch injury is about as large an injury as it has been considered feasible to repair. To repair an injury in a 10 or 12 ply tire with an eight-inch inner diameter, carrying seventy pounds pressure two reinforcing strips may be required. For example a five-inch strip may be applied first, and a three-inch strip may be applied over this, making a total of eight inches of reinforcement placed over the repair. Figuring a reinforcement of two hundred forty pounds per inch of fabric (as in the first example), and the strain on the tire as eight hundred forty pounds, the eight-inch repair gives a factor of safety of about 2½ to 1. This may be reinforced by a third ply to give a greater factor of safety.

In the truck tire repair one ply of fabric running circumferentially would give all the reinforcement generally required in that direction. In the passenger tire repair a piece of cord fabric running circumferentially, for example four or five inches or more on each side of the break will give an additional factor of safety, and may be desirable where the vehicle is to be run at high speeds, although it may be omitted. The circumferential patch generally overlies the bead-to-bead patch.

Such a repair requires less fabric than the repairs which are commonly employed and consequently weighs less—only a few ounces. If not too large it may be balanced by putting weights on the opposite side of the wheel. The repair will flex better than the usual type in which the cords run diagonally, because in this improved repair the cords in the principal patch lie bead-to-bead and are subjected to the minimum of flexing; and if a circumferential patch is used the number of cords flexed is far less than in the two diagonal patches which are in general use at the present time. There is nothing but rubber between the cords and the patch is not bulky.

The repair is strong because across their entire width (or substantially their entire width) the patches are tied on to all good cords in the original tire. In patches in which the cords run diagonally this is not true because those cords which pass over the break run parallel to, and are fastened to, broken cords.

Figure 2:
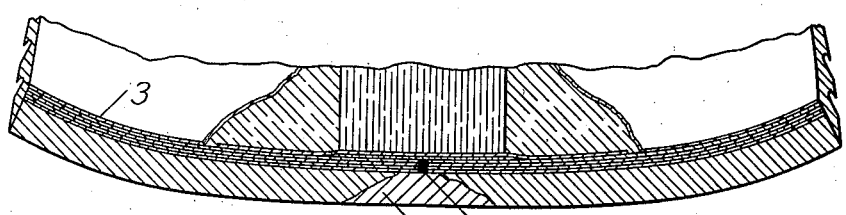
Figure 3:
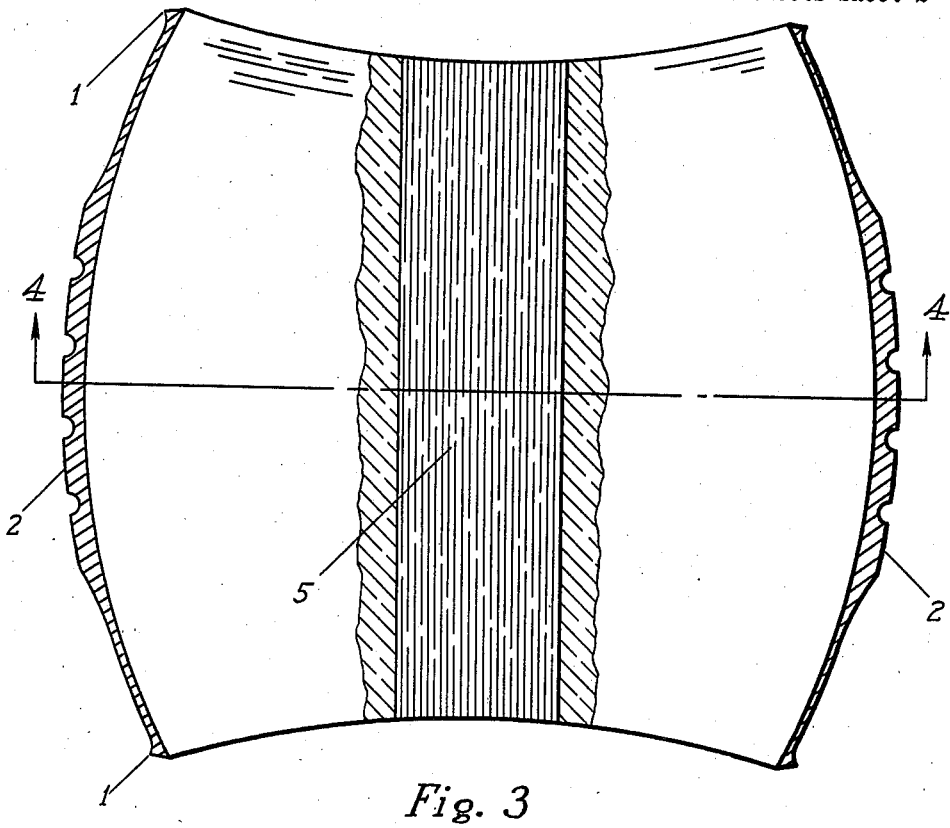
Figure 4:
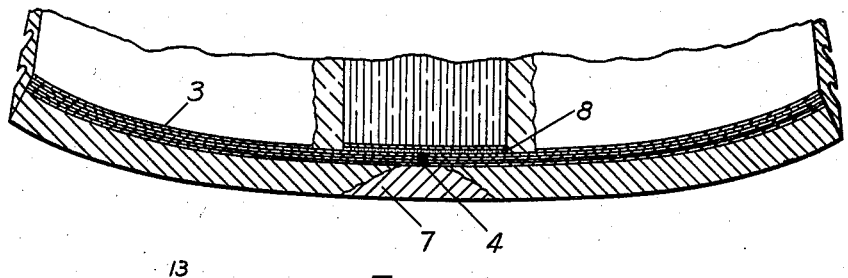
Figure 5:
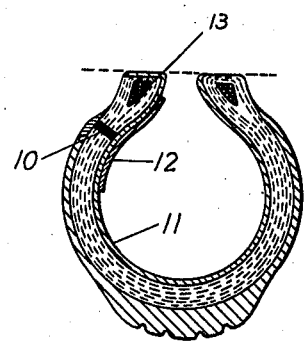

The invention will be further described in connection with the accompanying drawings in which Fig. 1 is a plan view looking vertically down on the interior of a tire with the walls forced apart by the application of pressure at the four corners of the section shown; Fig. 2 is an oblique view of a section on the line 2—2 of Fig. 1; Figs. 3 and 4 are a similar plan view and oblique view, respectively, of an alternative type of repair; and Fig. 5 is a section showing a repair near a bead of the tire.

Fig. 1 illustrates the tire with the beads 1 running horizontally across the page, and shows oblique sections of the tread 2 at each side.

In making the repair the thin coating of rubber 3 on the inner wall of the tire is buffed off in the usual manner on all sides of the break 4, and cement is applied as usual. The patch 5 which runs in the direction from bead to bead gives the principal reinforcement.

If the repair is made near the bead the patch may be passed under the bead, but generally this is not necessary. The patch 6 which gives circumferential reinforcement is optional, at least in passenger tires. The tread is repaired with new rubber 7 in the usual way.

It is generally desirable to thoroughly cushion the under side of the patch with rubber stock before it is put on to the tire. Somewhat more cushion than usual may be desirable.

Figs. 3 and 4 illustrate a repair, omitting the circumferential reinforcement shown in Figs. 1 and 2. A cushion 8 under the patch is shown in Fig. 4.

Fig. 5 illustrates a bead-to-bead patch 11 with a circumferential reinforcement 12 on a break 10 located near a bead of the tire. The end 13 of the bead-to-bead patch is passed under the bead.

It is important that the tire be in its normal shape when the repair is cured. In an adjustable sectional mold, for example, the tire may be distorted during the curing operation as by pulling the bead plates down too tightly. This makes the repaired section of the tire smaller than the rest of the tire. This must be avoided because it throws unnecessary strain on the reinforcement. It is important that the bead plates be adjusted to the size of the tire and that the tire be cured in its normal shape.

Various modifications may be made in the construction of the repair and its mode of preparation without departing from the invention as claimed.

I claim:

1. A repaired pneumatic tire with the cords running diagonally, a break in the cords and a patch of cord fabric on the inner surface of the tire over the break in which the principal reinforcing cords lie in the bead-to-bead direction perpendicular to the beads of the tire.

2. A repaired pneumatic tire with the cords running diagonally, a break in the cords, a patch of cord fabric on the inner wall of the tire over the break in which the principal reinforcing cords lie perpendicular to the beads of the tire and other cords lie circumferentially.

3. A repaired pneumatic tire with the cords running diagonally, a break in the cords, a patch of cord fabric on the inner wall of the tire over the break with its cords lying in the bead-to-bead direction perpendicular to the beads of the tire and another patch of cord fabric over the break and overlying the first patch with its cords lying circumferentially and without any patch in which the cords are parallel to the cords of the tire.

4. A repaired pneumatic tire with the cords running diagonally, a break in the cords, a patch of a pluralty of pieces of cord fabric in one of which pieces the cords lie in a bead-to-bead direction perpendicular to the beads of the tire, and in another of which pieces the cords lie circumferentially, each of the cords in all of said pieces being parallel to the cords in one of said two pieces.

JAMES C. HEINTZ.